United States Patent
Tsai

(10) Patent No.: US 6,898,723 B2
(45) Date of Patent: May 24, 2005

(54) METHOD FOR VERIFYING CLOCK SIGNAL FREQUENCY OF COMPUTER SOUND INTERFACE THAT INVOLVES CHECKING WHETHER COUNT VALUE OF COUNTER IS WITHIN TOLERABLE COUNT RANGE

(75) Inventor: Chun-Nan Tsai, Hsin-Chu (TW)

(73) Assignee: Mitac International Corp., Hsinchu (TW)

( * ) Notice: Subject to any disclaimer, the term of this patent is extended or adjusted under 35 U.S.C. 154(b) by 564 days.

(21) Appl. No.: 10/109,702

(22) Filed: Apr. 1, 2002

(65) Prior Publication Data

US 2003/0188053 A1 Oct. 2, 2003

(51) Int. Cl.$^7$ ............ G06F 1/04; G06F 13/28; G06F 11/00
(52) U.S. Cl. ............ 713/500; 713/502; 710/22; 710/34; 714/48
(58) Field of Search ............ 713/500, 502; 710/22, 34, 62; 714/48

(56) References Cited

U.S. PATENT DOCUMENTS

| | | | | |
|---|---|---|---|---|
| 4,658,350 A | * | 4/1987 | Eggebrecht et al. | 710/26 |
| 5,287,528 A | * | 2/1994 | Canik et al. | 710/105 |
| 5,319,754 A | * | 6/1994 | Meinecke et al. | 710/52 |
| 5,754,884 A | * | 5/1998 | Swanstrom | 710/22 |
| 5,784,595 A | * | 7/1998 | Devins et al. | 703/24 |
| 5,968,148 A | * | 10/1999 | Priem | 710/62 |
| 5,974,478 A | * | 10/1999 | Wood et al. | 710/22 |
| 5,991,844 A | * | 11/1999 | Khosrowpour | 710/312 |
| 6,078,742 A | * | 6/2000 | Chow | 703/25 |
| 6,148,345 A | * | 11/2000 | Yamaki | 709/253 |
| 6,292,854 B1 | * | 9/2001 | Priem | 710/22 |
| 6,778,543 B1 | * | 8/2004 | Frouin et al. | 370/402 |

OTHER PUBLICATIONS

M.R. Iravani, "A Software Tool for Coordination of controllers in Power Systems", IEEE Transactions on Power Systems, vol. 5, No. 1, Feb. 1990, pp. 119–125.*

* cited by examiner

*Primary Examiner*—Chun Cao
(74) *Attorney, Agent, or Firm*—Rosenberg, Klein & Lee

(57) ABSTRACT

A method for verifying clock signal frequency of a sound interface of a computer system is disclosed. The processes include steps of initializing and setting a DMA controller and the sound interface, starting DMA data transfer, resetting a time out counter. During the DMA data transfer, a step of incrementing the time out counter is performed until the selected DMA channel of the DMA controller reaches a terminal count condition. After each increment, it is checked if DMA data transfer is time out. When the DMA channel of the DMA controller reaches the terminal count condition, the current count of the time out counter is compared with a maximum tolerable count and a minimum tolerable count. If the count of the time out counter is between the maximum and minimum tolerable counts, a message indicating the clock signal frequency of the sound interface is correct is issued, otherwise a message indicating the clock signal frequency is incorrect is issued.

4 Claims, 3 Drawing Sheets

METHOD FOR VERIFYING CLOCK SIGNAL FREQUENCY OF COMPUTER SOUND INTERFACE THAT INVOLVES CHECKING WHETHER COUNT VALUE OF COUNTER IS WITHIN TOLERABLE COUNT RANGE

BACKGROUND OF THE INVENTION

1. Field of the Invention

The present invention generally relates to a method for testing computer system, and more particularly, to a method for verifying clock signal frequency of a sound interface of the computer system.

2. Description of the Prior Art

The trend of multimedia appliance of computer industry brings forward wide use of sound interface in computers, especially personal computers. The computer sound interface is commonly made as a sound blaster card or audio card adapted to be plugged in an expansion slot of a computer. Typically, the computer sound card available in the markets is provided with at least one sound data output port into which an audio output device, such as a speaker, can be plugged. Some of the computer sound cards are further provided with a sound data input port for receiving external sound data from for example a microphone and then applying the received sound data to the computer.

Typically, a sound interface of a computer system comprises a number of components, including an analog-to-digital converter, an audio signal coding/decoding (CODEC) circuit, a digital signal processor, and a digital-to-analog converter. The audio signal that the sound interface receives from a microphone is in the analog form. Such an analog signal may be converted by the analog-to-digital converter into digital data. Since the digital sound data is usually huge, most of digital signal processors are capable to compress the digital sound data in order to save storage space. The compressed digital sound data is then transmitted to a central processing unit of the computer to be stored in a data storage device for example a hard disk in a predetermined data format, such as WAV format.

In replaying the sound data, the central processing unit of the computer first retrieves the compressed sound data from the hard disk or other data storage device, such as a compact optical disk (CD-ROM). The compressed sound data is then processed by the digital signal processor to decompress the digital sound data. The decompressed sound data is then processed by the digital-to-analog converter to generate a continuous analog signal which can then be applied to drive a sound output device, such as a speaker. Since the data of the sound data is typically very huge, most of the sound cards adapt DMA (Direct Memory Access) technique for transfer of the data of the sound data.

However, since the sound data is sampled at a frequency determined by a clock signal supplied by a clock signal generator, an incorrect clock signal frequency may lead to noises or abnormal sounds generated in the sound output device.

Conventionally, an oscilloscope can detect and determine if the clock signal frequency of the sound interface is correct. Such an operation is, however, very time-consuming and is thus not suitable for mass production requirements.

SUMMARY OF THE INVENTION

Accordingly, an object of the present invention is to provide a method for simply verifying the correction of the clock signal frequency of a computer sound interface.

Another object of the present invention is to provide a method for verifying computer sound interfaces by checking data transfer of a Direct Memory Access (DMA) controller and employing simple counting operation to determine whether the clock signal frequency of the sound interface is correct.

To achieve the above objects, in accordance with a preferred embodiment of the present invention, a method for verifying a computer sound interface is achieved by incrementing a counter until a DMA channel of the DMA controller reaches a terminal count condition. After each increment, it is checked if data transfer of the DMA controller is time out. If it is time out, a time out message is issued. If not, the incrementing operation continues. When the DMA channel of the DMA controller reaches the terminal count condition, the current count of the counter is compared with a maximum tolerable count and a minimum tolerable count determined in accordance with tolerable clock jitter of the clock signal of the sound interface and bus latency of the system bus of the computer system. If the current count is between the maximum and minimum tolerable counts, a message indicating the clock signal frequency of the sound interface is correct is issued, otherwise a message indicating the clock signal frequency is incorrect is issued.

BRIEF DESCRIPTION OF THE DRAWINGS

The present invention will be apparent to those skilled in the art by reading the following description of a best mode of operation thereof, with reference to the attached drawings, in which.

DETAILED DESCRIPTION OF THE PREFERRED EMBODIMENTS

Figure 1:
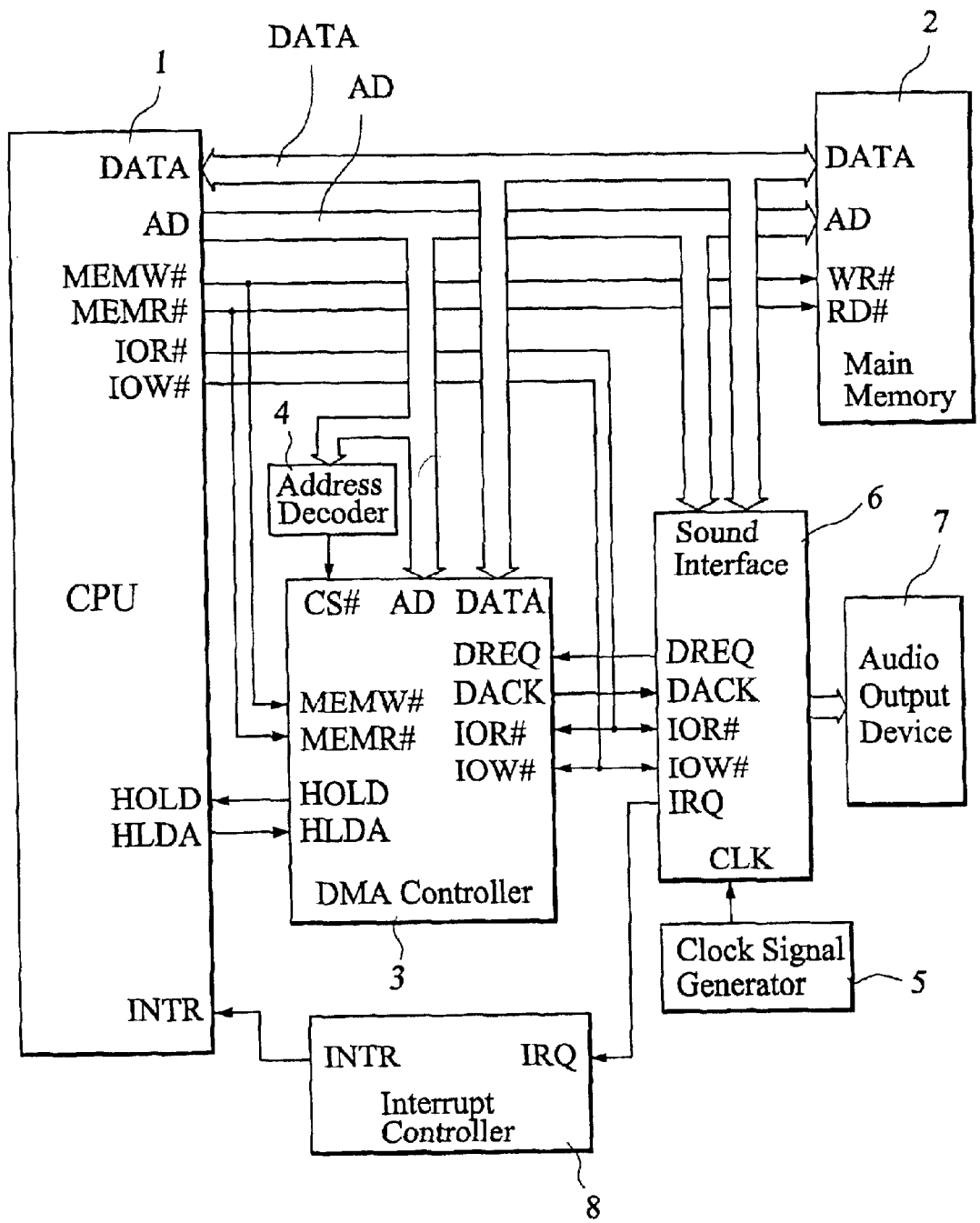
FIG. 1 is a simplified block diagram of a computer system including a DMA controller and a sound interface in accordance with a preferred embodiment of the present invention.

With reference to the drawings and in particular to FIG. 1, a simplified system block diagram of a computer system including a DMA (Direct Memory Access) controller and a sound interface is shown. The computer system comprises a central processing unit (CPU) 1 and a main memory 2 accessible by the central processing unit 1 via system buses, including data bus DATA and address bus AD. The central processing unit 1 further includes a Memory Write Signal MEMW# and a Memory Read Signal MEMR#.

The central processing unit 1 communicates with the DMA controller 3 via signals of data bus DATA, address bus AD, a Chip Select Signal CS#, an Input/output Read Signal IOR#, an Input/output Write Signal IOW#, a Bus Request Signal HOLD and a Bus Grant Signal HLDA. The address bus AD is decoded by an address decoder 4 to generate the Chip Select Signal CS# applied to the DMA controller 3. A sound interface 6 receives a Clock Signal CLK generated by a clock signal generator 5. The Clock Signal CLK is used to generate an audio sampling rate for the sound interface 6. Typically, the sound interface 6 is provided with an audio coding/decoding circuit therein. An audio output device 7 is coupled to an audio output port of the sound interface 6.

The DMA controller 3 accesses the sound interface 6 via signals of DMA Request Signal DREQ, DMA Acknowledge Signal DACK, Input/output Read Signal IOR#, and Input/output Write Signal IOW#. The sound interface 6 may generate an Interrupt Request Signal IRQ to an interrupt controller 8, and then the interrupt controller 8 generates an Interrupt Signal INTR to the central processing unit 1.

Figure 2:
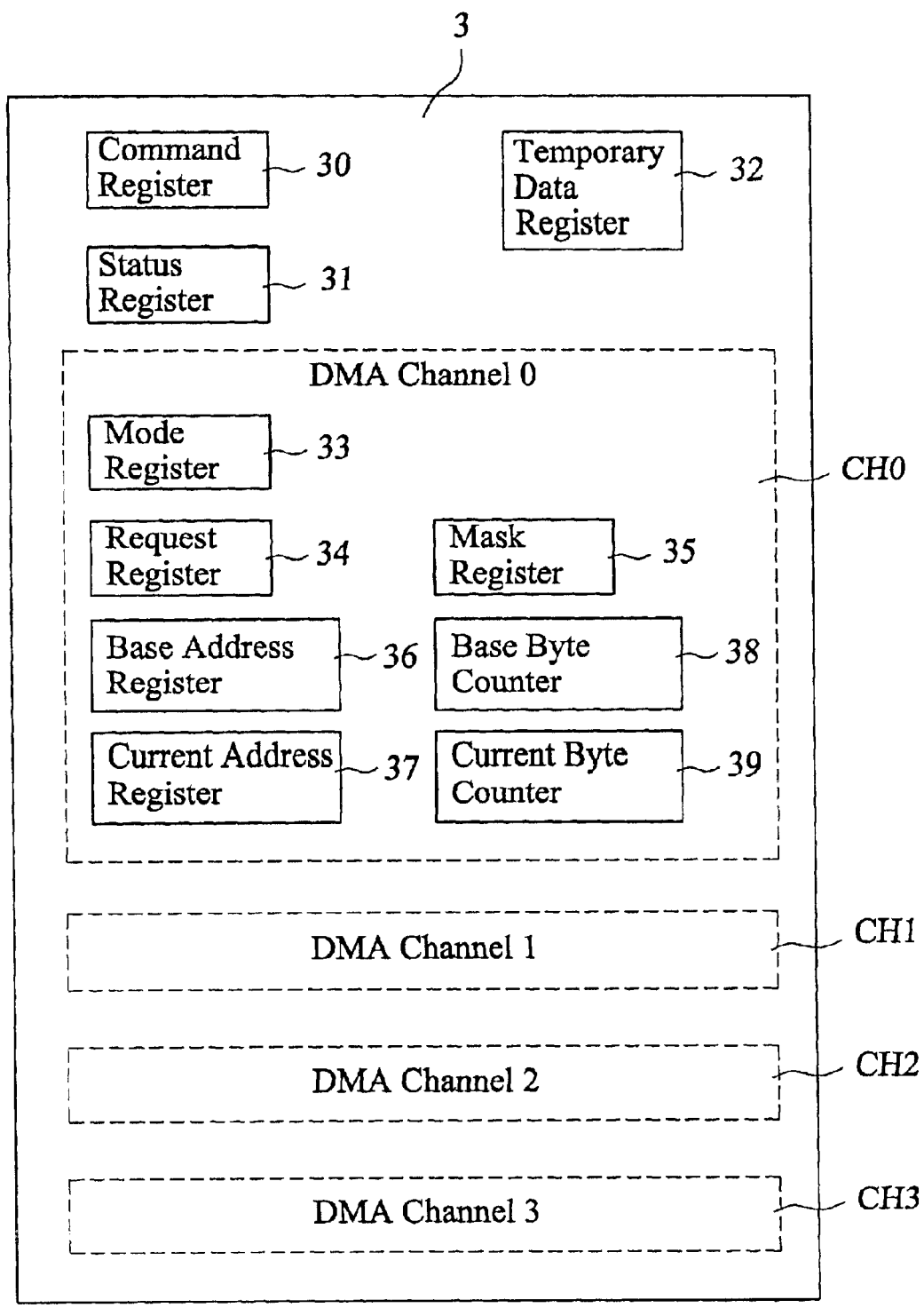
FIG. 2 shows internal registers of a DMA controller relative to the method of the present invention.

FIG. 2 shows internal registers of the DMA controller 3 in accordance with a preferred embodiment of the present invention. The DMA controller 3 can be any suitable integrated chips commercially available, such as 8237A or 82371AB, manufactured by Intel Corporation. The DMA controller 3 is provided with four independent DMA channels CH0–CH3.

The DMA controller 3 is programmable, which comprises a command register 30, a status register 31 and a temporary data register 32. Each DMA channel CH0, CH1, CH2, CH3 comprises a mode register 33, a request register 34, a mask register 35, a base address register 36, a current address register 37, a base byte counter 38 and a current byte counter 39. The command register 30 is for controlling the operation of the DMA controller. The status register 31 is to store the status of data transfer of the DMA controller. The mode register 33 sets the operation mode of each particular DMA channel CH0, CH1, CH2, CH3. The mask register 35 is for suppressing the DMA Request Signal DREQ. The request register 34 is for selection among the DMA channels CH0–CH3 and to set or clear the DMA Request Signal DREQ. The base address register 36 stores a base address for the DMA data transfer. The current address register 37 stores a current address of the data transfer. The counters 38, 39 store values associated with the number of bytes of the DMA data transfer.

Figure 3:
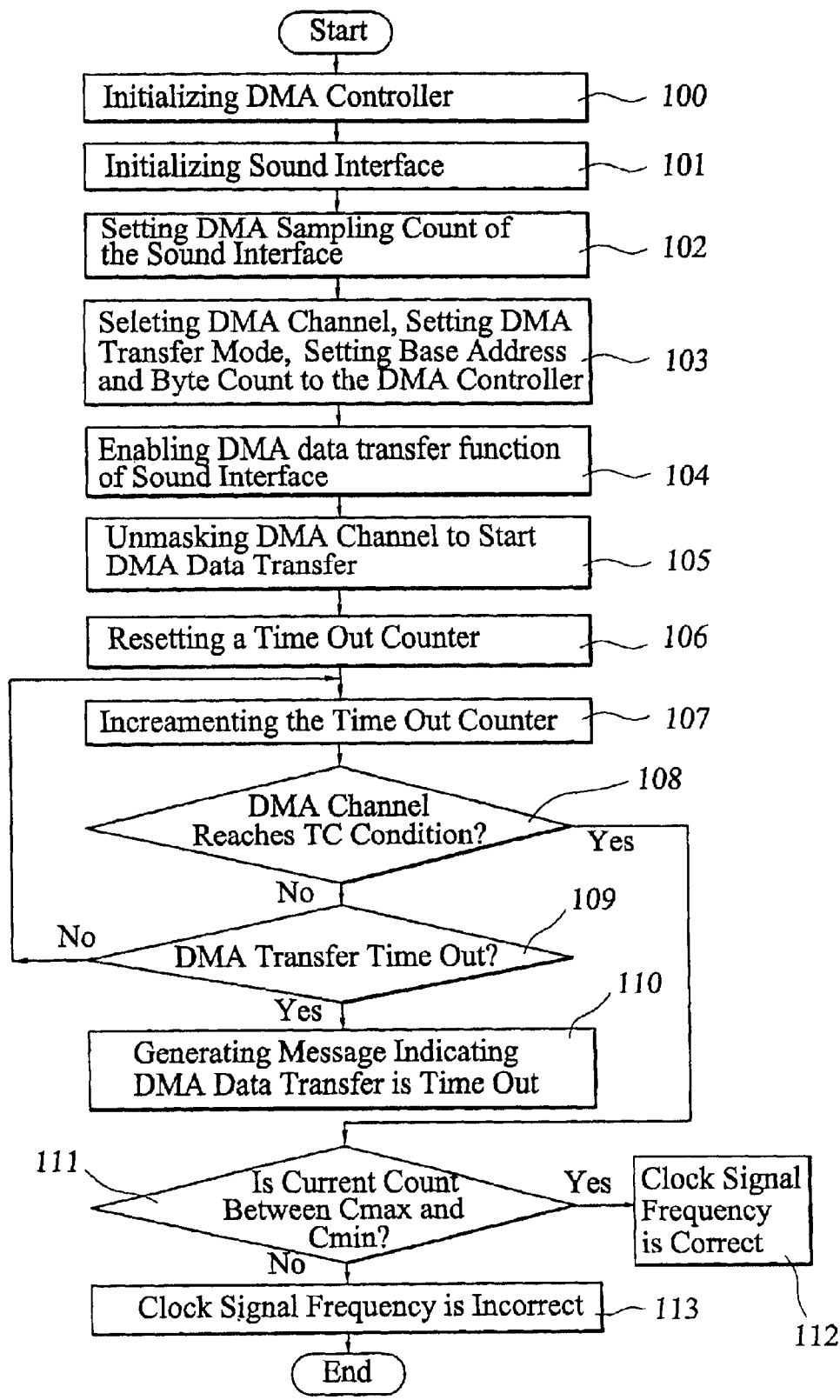
FIG. 3 is a flow chart illustrating the operation in accordance with the present invention.

FIG. 3 shows a flow chart illustrating the operation in accordance with the present invention. At the beginning of the verifying operation, the DMA controller 3 of the compute system as shown in FIG. 1 is initialized at step 100 to clear the registers of the DMA controller 3 and to set the mask registers 35. At step 101, an initialization step including setting the audio sampling rate and data format to the sound interface is performed.

A DMA sampling count of the audio coding/decoding circuit of the sound interface is then set at step 102. At step 103, a DMA channel is selected and a DMA data transfer mode is set to the DMA controller 3. Then, a base address is set in the base address register 36 and a byte count is set in the base byte counter 38 to the DMA controller 3. At step 104, DMA data transfer function of the sound interface is enabled. At step 105, the DMA channel selected in the DMA controller is unmasked to start the DMA data transfer. During the DMA data transfer, the sound data from the main memory is transferred to the sound interface via a selected DMA channel of the DMA controller 3.

A step of resetting a time out counter is performed at step 106. The time out counter can be a software based or software controlled counter.

During the DMA data transfer, the time out counter is incremented by 1 at step 107. At step 108, the DMA channel of the DMA controller 3 is checked with a terminal count (TC) condition. This is done by checking the terminal count TC bit of the status register 31 of the DMA controller 3. When the DMA channel reaches the predetermined terminal count condition, the TC bit of the status register 31 of the DMA controller 3 is set to "1" for indicating the TC condition. By checking the TC bit of the status register 31, it can be checked whether the DMA channel reaches the TC condition or not.

If the selected DMA channel of the DMA controller 3 does not reach the TC condition as tested at step 108, the DMA controller 3 is checked with a time-out condition of data transfer at step 109. If the DMA data transfer is not time out, the process goes back to step 107 and repeats steps 107–109. If the DMA data transfer is time out, a message indicating time out of DMA data transfer may be generated at step 110.

When the DMA channel of the DMA controller 3 reaches the TC condition at step 108, the process goes to step 111. At step 111, the current count stored in the time out counter defined at step 107 is checked to judge whether the current count is between a maximum tolerable count and a minimum tolerable count. The maximum and minimum tolerable counts are determined in accordance with the tolerable clock jitter of the clock signal generator and bus latency of the system bus of the computer system. If the current count is between the maximum and the minimum tolerable counts, then a message indicating the clock signal frequency of the sound interface is correct is issued at step 112. On the contrary, if it is not, a message indicating the clock signal frequency is incorrect is issued at step 113.

Although the present invention has been described with reference to the best mode of operation thereof, it is understood that modifications and changes may be made without departing from the scope of the present invention which is intended to be defined by the appended claims.

I claim:

1. A method for verifying a clock signal frequency of a sound interface installed in a computer system, the computer system comprises a main memory for storing sound data, a Direct Memory Access (DMA) controller having at least one DMA channel for performing a DMA data transfer which transfers the sound data from the main memory to the sound interface, a status register having a terminal count bit, and a clock signal generator for supplying a clock signal to the sound interface, the method comprising the following steps:

(a) initializing and setting the Direct Memory Access controller of the computer system and the sound interface to start the DMA data transfer;

(b) resetting a time out counter;

(c) incrementing the time out counter to get a current count during the DMA data transfer;

(d) checking whether the DMA channel of the Direct Memory Access controller reaches a terminal count condition by checking the terminal count bit of the status register of the Direct Memory Access controller;

(e) if negative in step (d), further checking if the DMA data transfer is time out, and going back to step (c) if it is not time out, otherwise issuing a time out message if it is time out; and (f) if positive in step (d), further checking if the current count recorded in the time out counter is between a maximum tolerable count and a minimum tolerable count, and issuing a message indicating the clock signal frequency is correct if the current count is between the maximum tolerable count and the minimum tolerable count, otherwise issuing a message indicating the clock signal frequency is incorrect if the current count is not between the maximum tolerable count and the minimum tolerable count.

2. The method as claimed in claim 1, wherein the step (a) comprises the following steps:

(a1) enabling and resetting the Direct Memory Access controller;

(a2) initializing and setting the sound interface;

(a3) setting a DMA sampling count of the sound interface;

(a4) selecting a DMA channel and setting a DMA data transfer mode to the Direct Memory Access controller, and then setting a base address in a base address register and setting a byte count in a base byte counter of the Direct Memory Access controller;

(a5) enabling the DMA data transfer of the sound interface; and (a6) unmasking the DMA channel of the Direct Memory Access controller to start the DMA data transfer.

3. The method as claimed in claim 2, wherein the step (a2) further comprises a step of setting a sampling rate and a data format to the sound interface.

4. The method as claimed in claim 1, wherein the maximum tolerable count and the minimum tolerable count of step (f) are determined in accordance with a tolerable clock jitter of the clock signal and a bus latency of the computer system.

* * * * *